United States Patent
Lim

(10) Patent No.: US 9,772,523 B2
(45) Date of Patent: Sep. 26, 2017

(54) DISPLAY DEVICE

(71) Applicant: Samsung Display Co., Ltd., Yongin-si (KR)

(72) Inventor: Hongbin Lim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 6 days.

(21) Appl. No.: 14/950,976

(22) Filed: Nov. 24, 2015

(65) Prior Publication Data

US 2016/0306212 A1 Oct. 20, 2016

(30) Foreign Application Priority Data

Apr. 20, 2015 (KR) .................. 10-2015-0055359

(51) Int. Cl.
*G02F 1/1339* (2006.01)
*G02F 1/1345* (2006.01)
*G02F 1/1333* (2006.01)

(52) U.S. Cl.
CPC .......... *G02F 1/1339* (2013.01); *G02F 1/1345* (2013.01); *G02F 1/133345* (2013.01)

(58) Field of Classification Search
CPC .............................. G02F 1/1339; G02F 1/1345
See application file for complete search history.

(56) References Cited

U.S. PATENT DOCUMENTS

2003/0058395 A1* 3/2003 Hagiwara ............. G02F 1/1345 349/139
2004/0165120 A1* 8/2004 Woo ....................... G02F 1/1339 349/42
2005/0062898 A1* 3/2005 Imayama .......... G02F 1/133345 349/43
2009/0296038 A1* 12/2009 Yoon ..................... G02F 1/1339 349/149
2010/0085526 A1* 4/2010 Chen ..................... G02F 1/1339 349/152
2010/0283955 A1* 11/2010 Kim ....................... G02F 1/1345 349/149
2011/0096258 A1 4/2011 Shim et al.
2014/0111755 A1* 4/2014 Anjo ................. G02F 1/134363 349/151

(Continued)

FOREIGN PATENT DOCUMENTS

KR 1020050000193 1/2005
KR 1020060084147 7/2006

(Continued)

*Primary Examiner* — James Dudek
(74) *Attorney, Agent, or Firm* — H.C. Park & Associates, PLC

(57) ABSTRACT

A liquid crystal display device including: a first substrate including a pixel region and a fan-out unit on a periphery of the pixel region, the pixel region including pixels; gate lines disposed on the first substrate; data lines disposed on the first substrate to intersect the gate lines, the data lines being insulated from the gate lines; a data fan-out line extending from one of the data lines to be disposed in the fan-out unit; a data pad line disposed in the fan-out unit and electrically connected to a driving integrated circuit; a second substrate opposing the first substrate; and a sealant bonding the first substrate to the second substrate. The data fan-out line overlaps the data pad line between the pixel region and the sealant.

18 Claims, 6 Drawing Sheets

(56) References Cited

U.S. PATENT DOCUMENTS

2014/0284574 A1    9/2014   Hong et al.

FOREIGN PATENT DOCUMENTS

| KR | 1020080021177 | 3/2008 |
| KR | 1020080035369 | 4/2008 |
| KR | 1020130103136 | 9/2013 |
| KR | 1020140115037 | 9/2014 |

\* cited by examiner

DISPLAY DEVICE

CROSS-REFERENCE TO RELATED APPLICATION

This application claims priority from and the benefit of Korean Patent Application No. 10-2015-0055359, filed on Apr. 20, 2015, which is hereby incorporated by reference for all purposes as if fully set forth herein.

BACKGROUND

Field

Exemplary embodiments relate to a liquid crystal display ("LCD") device, and more particularly, to an LCD device capable of conducting an electrode defect inspection during a manufacturing process thereof.

Discussion of the Background

With the advent of an era of highly developed information technology, a need for flat panel display ("FPD") devices having various advantages, such as being slim, lightweight, having low power-consumption, and the like, has increased. In particular, liquid crystal display ("LCD") devices are garnering attention for the wide range of applications as a monitor of a laptop computer or a desktop computer, due to the characteristics of high-resolution, excellent color display performance, high picture quality, and the like.

In general, an LCD device includes two substrates having electrodes disposed thereon. The two substrates may be disposed in a manner in which respective surfaces thereof formed with the electrodes oppose one another, and a liquid crystal material is injected between the two substrates. Further, liquid crystal molecules of the liquid crystal material are rearranged by an electric field generated upon the voltage between the two electrodes, and thereby the amount of transmitted light is adjusted in the LCD device to enable an image to be displayed.

Such an LCD device includes a liquid crystal panel or liquid crystal layer having injected liquid crystal between two substrates, a backlight disposed below the liquid crystal panel and used as a light source, and a driving unit driving the liquid crystal panel. The driving unit may be disposed outside of the liquid crystal panel but electrically connected to the liquid crystal panel.

In this configuration, the driving unit may include a driving circuit for applying a signal to a wiring of the liquid crystal panel. The driving circuit is classified into several types including a chip-on-glass ("COG"), a tape-carrier-package ("TCP"), a chip-on-film ("COF"), and the like, based on a scheme of mounting the driving circuit on the liquid crystal panel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments relate to a liquid crystal display ("LCD") device useful for conducting an electrode defect inspection on a data line during a manufacturing process thereof.

Additional aspects will be set forth in the detailed description which follows, and, in part, will be apparent from the disclosure, or may be learned by practice of the inventive concept.

An exemplary embodiment discloses a liquid crystal display device including: a first substrate including a pixel region and a fan-out unit on a periphery of the pixel region, the pixel region including pixels; gate lines disposed on the first substrate; data lines disposed on the first substrate to intersect the gate lines, the data lines being insulated from the gate lines; a data fan-out line extending from one of the data lines to be disposed in the fan-out unit; a data pad line disposed in the fan-out unit and electrically connected to a driving integrated circuit; a second substrate opposing the first substrate; and a sealant bonding the first substrate to the second substrate. The data fan-out line overlaps the data pad line between the pixel region and the sealant.

An exemplary embodiment also discloses a display device including: a first substrate including a pixel region and a fan-out unit on a periphery of the pixel region, the pixel region including pixels; a pad line disposed on the first substrate and electrically connected to a driving circuit, a portion of the pad line being disposed in the fan-out unit; an insulating layer disposed on the pad line; a conductive line configured to be connected to a gate electrode or a source electrode of a transistor, the conductive line being a gate line or a data line; a fan-out line extending from the conductive line to be disposed in the fan-out unit, the fan-out line configured to at least partially face the portion of the pad line; and a second substrate opposing the first substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
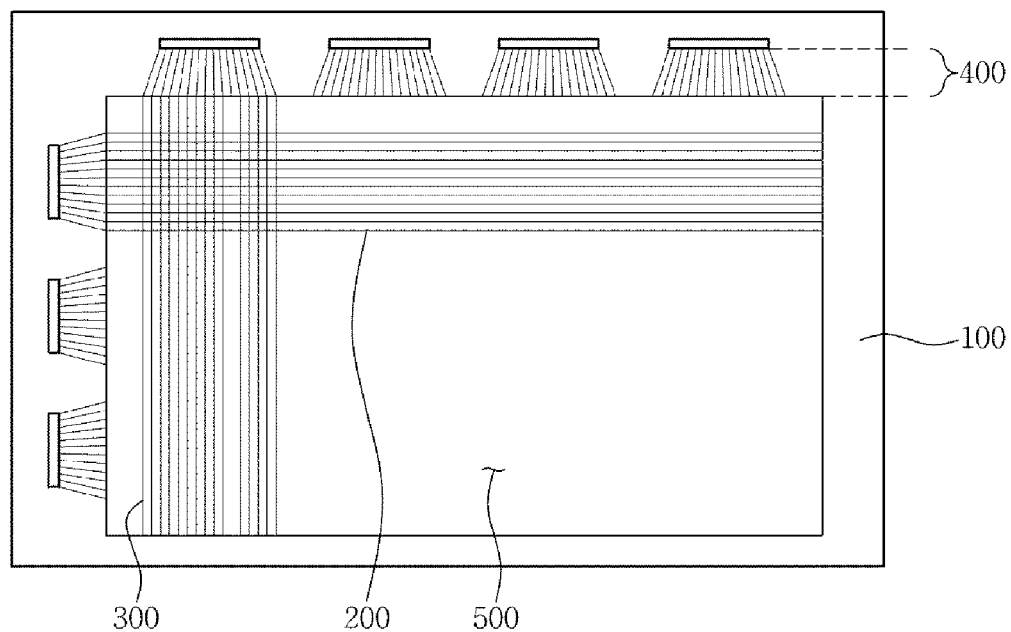
FIG. 1 is a plan view illustrating a liquid crystal display ("LCD") device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
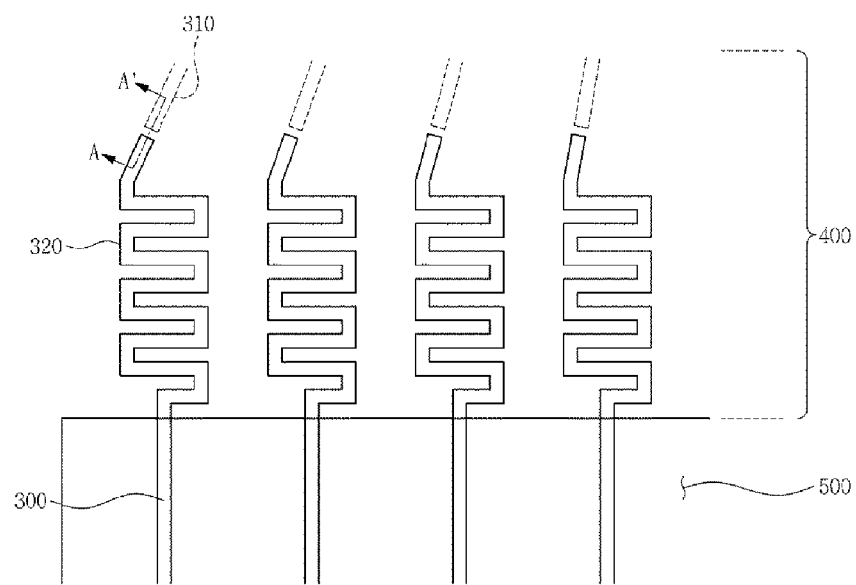
FIG. 2 is a plan view illustrating an example in which a data fan-out line and a data pad line are spaced apart from each other according to a related art.

FIG. 1 is a plan view illustrating an LCD device; FIG. 2 is a plan view illustrating an example in which a data fan-out line and a data pad line are spaced apart from each other according to a related art; and FIG. 3 is a cross-sectional view taken along section line A-A' of FIG. 2 according to a related art.

Figure 3:
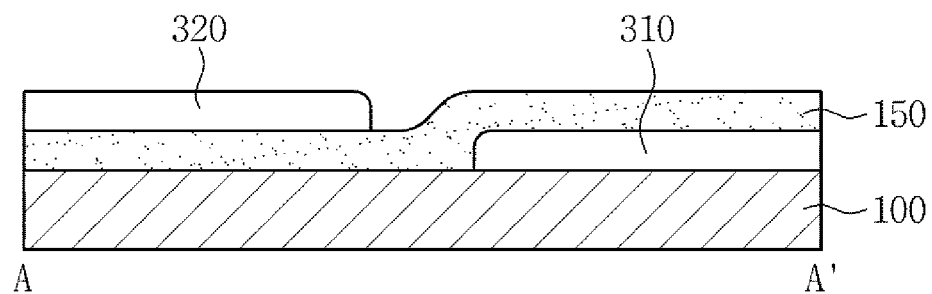
FIG. 3 is a cross-sectional view taken along section line A-A' of FIG. 2 according to a related art.

Referring to FIG. 1, FIG. 2, and FIG. 3, the LCD device may include a lower substrate 100 and an upper substrate (not illustrated), and a liquid crystal layer (not illustrated) interposed therebetween. A description pertaining to the lower substrate 100 will be provided hereinbelow.

The LCD device may include a gate line 200 on the lower substrate 100 and a data line 300 intersecting the gate line 200. The gate line 200 and the data line 300 may be insulated from each other. An image may be displayed through a pixel region 500 in which the gate line 200 and the data line 300 are disposed. The pixel region 500 includes pixels, and each pixel may correspond to a gate line, a data line, and a transistor connected to a corresponding gate line and a corresponding data line.

A thin film transistor substrate may be used as a circuit board for independently driving each pixel in an LCD device, an electroluminescent ("EL") display device, and the like. The thin film transistor substrate may include a scanning signal wiring (or the gate line 200), which transmits a scanning signal, an image signal wiring (or the data line 300), which transmits an image signal, a thin film transistor (not illustrated) connected to the gate line 200 and the data line 300, a pixel electrode connected to the thin film transistor (not illustrated), a gate insulating layer covering the gate line 200 for an insulation thereof, a protection layer covering the thin film transistor (not illustrated) and the data line 300 for an insulation thereof, and the like.

The gate insulating layer may include or may be formed of silicon nitride ($SiN_X$) or silicon oxide ($SiO_X$). The protection layer may include or may be formed of an inorganic insulating material or an organic insulating material, and the protection layer may have a planarized surface. Such an organic insulating material may have a dielectric constant of about 4.0 or less, and may have photosensitivity. The gate insulating layer and/or the protection layer may serve as an electric insulator.

The thin film transistor (not illustrated) may include a gate electrode which is a portion of the gate line 200, a semiconductor layer forming a channel, a source electrode and a drain electrode, the gate insulating layer, the protection layer, and the like. The source electrode may be a portion of the data line 300, and the drain electrode may be electrically connected to a pixel electrode. The thin film transistor (not illustrated) may be a switching element transmitting or blocking an image signal which is transmitted through the data line 300 to the pixel electrode in response to a scanning signal transmitted through the gate line 200.

A driving integrated circuit may be connected to the thin film transistor substrate in order to apply driving signals to the gate line 200 and the data line 300. The driving integrated circuit may be connected to the gate line 200 and the data line 300 through pads, e.g., a gate pad and a data pad, and the pad may be densely formed in a relatively narrow area for the connection to the driving integrated circuit. The area in which the pads are disposed may be a peripheral area of the pixel region. On the other hand, since intervals between the gate lines 200 and intervals between the data lines 300 which are disposed in the pixel region 500 have widths to be determined based on a pixel size, the intervals between gate lines and the intervals between data lines may have widths wider than intervals between the gate lines or the data lines disposed in the area in which the pads are located. Accordingly, an area in which an interval between lines gradually increases along the lines may be present between a pad unit and the pixel region 500 (see e.g., FIG. 1), and such an area may be referred to as a fan-out unit 400. Based on a structure of the fan-out unit 400, a length of a line in the fan-out unit 400 connected to a central portion of the driving integrated circuit may differ from a length of a line in the fan-out unit 400 connected to an either end of the driving integrated circuit. Consequently, a difference in levels of resistance which is caused by the different lengths of the lines may cause a difference in levels of data voltages applied to a pixel. An electrode pattern having a zigzag form may be applied based on a position of a wiring in order to reduce the difference in the levels of resistance between the lines, such that the level of resistance is corrected.

As illustrated in FIG. 2, a data pad line 310 and a data fan-out line 320 may be disposed in the fan-out unit 400. The data pad line 310 may be connected to the driving integrated circuit, and may be connected to the data fan-out line 320 through a bridge electrode (not illustrated). The data fan-out line 320 may be connected to the data line 300. The data pad line 310 and the data fan-out line 320 may include or may be formed of a material including a conductive metal.

The data pad line 310 and the data fan-out line 320 may be formed of different conductive materials, and may be formed through different processes. In addition, the data pad line 310 may be formed simultaneously with the gate line 200.

In a substrate on which the data pad line 310, the gate insulating layer 150, and the data fan-out line 320 are stacked, the data pad line 310 and the data fan-out line 320 may be spaced apart from one another by the gate insulating layer 150 such that the data pad line 310 and the data fan-out line 320 are electrically insulated from one another. The data pad line 310 and the data fan-out line 320 may be electrically connected to one another by the bridge electrode (not illustrated). The bridge electrode (not illustrated) may form contact holes by removing the gate insulating layer 150 or the protection layer which protects the data pad line 310 and the data fan-out line 320, and may fill the contact holes to form a conductive layer or a conductive connector connecting between the data pad line 310 and the data fan-out line 320 through the contact holes so as to allow the data pad line 310 and the data fan-out line 320 to be electrically connected to one another. The bridge electrode (not illustrated) may include a transparent conductive layer. For example, the bridge electrode (not illustrated) may include or may be formed of indium-tin oxide (ITO) or indium-zinc oxide (IZO).

An additional process for forming the bridge electrode (not illustrated) may not be particularly necessary. During a process of forming the pixel electrode of the LCD device, the gate insulating layer 150 and the protection layer, which protect the data fan-out line 320 and the data pad line 310, may be removed, and the bridge electrode (not illustrated) may be formed along with the pixel electrode. According to an exemplary embodiment, an increase in manufacturing costs due to having to forming the bridge electrode (not illustrated) separately from the pixel electrode may be unnecessary since the process of forming the bridge electrode (not illustrated) may be performed in the process of forming the pixel electrode. One mask pattern may be used to form the pixel electrode and the bridge electrode. Further, the pixel electrode and the bridge electrode may be formed partially in the same layer.

In an exemplary embodiment, a bottom gate structure in which the gate line 200 is formed in a lowermost portion of the thin film transistor (not illustrated) is given by way example. However, the structure of the gate line 200 is not particularly limited thereto. A top gate structure in which the gate line 200 and a gate electrode is disposed above a semiconductor layer may also be applicable.

The data pad line 310 or the data fan-out line 320 connected to the driving integrated circuit may include a zigzag pattern. The zigzag pattern may include a repetitive pattern of "^" shape, a repetitive pattern of "≅" as shown in e.g., FIG. 2 and FIG. 5, and the like. The data pad line 310 or the data fan-out line 320 connected to a central portion of the driving integrated circuit may have an increased level of resistance by increasing a length of the line by including the zigzag pattern, and a data pad line 310 or a data fan-out line 320 connected to an edge portion of the driving integrated circuit may not include the zigzag pattern or may include a portion thereof.

FIG. 3 is a cross-sectional view taken along section line A-A' of FIG. 2 according to a related art.

FIG. 3 shows a cross-sectional view illustrating the lower substrate 100 in a manufacturing process. The data pad line 310, the gate insulating layer 150, and the data fan-out line 320 may be sequentially stacked on the lower substrate 100. In order to prevent or reduce the chance of transferring a defective product to a subsequent process, an open-short ("OS") inspection for verifying a presence of a short-circuit or a disconnection of the data line 300 and the data fan-out line 320 may be performed.

In the OS inspection, an inspection signal may be applied using an inspection terminal (not illustrated) of the data line 300 below the lower substrate 100. The applied inspection signal may be detected by an output terminal connected to the data fan-out line 320, and thereby a presence of a defect such as a short-circuit or a disconnection of the data fan-out line 320 may be identified and determined. The inspection signal used in the OS inspection may include a direct current ("DC") voltage, an alternating current ("AC") voltage, a pulse wave input, or the like.

During the OS inspection, data lines including the data line 300 may be inspected simultaneously. During the OS inspection conducted in the electrode structure illustrated in FIG. 3, a defect of the data line 300 and the data fan-out line 320 may be detected whereas a defect of the data pad line 310 may not be detected through the electric text manner since the data pad line 310 is not connected to the inspection terminal (not illustrated).

Figure 4:
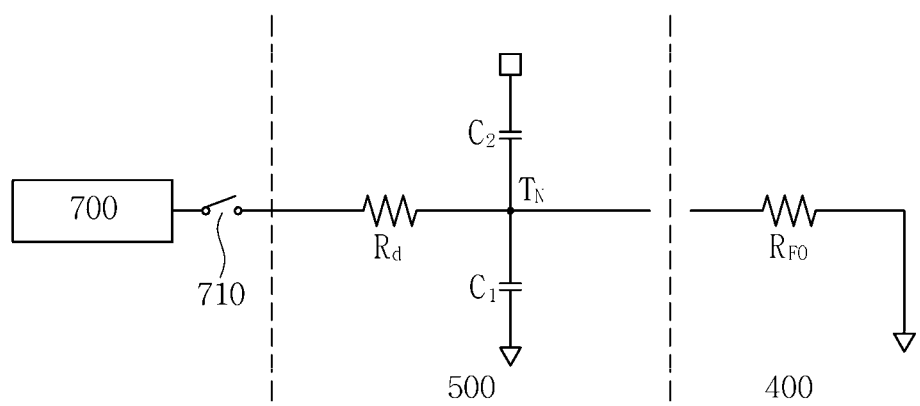
FIG. 4 is a view illustrating an equivalent circuit of an open-short ("OS") inspection circuit of an electrode of a substrate of FIG. 2 according to a related art.

FIG. 4 is a view illustrating an equivalent circuit of an OS inspection circuit of an electrode of a substrate of FIG. 2 according to a related art. The OS inspection circuit 700 may be used in the LCD device having the structure of the data line 300 of FIG. 3. The OS inspection circuit 700 may apply an inspection signal to one side of the data line 300, and may measure the output voltage at an inspection node $T_N$ disposed on an opposite side of the data line 300. The inspection signal applied by the OS inspection circuit 700 may be a DC signal, an AC signal, a pulse signal, or the like. The inspection node $T_N$ of the fan-out unit 400 may output an inspection signal affected by parasitic capacitors $C_1$ and $C_2$ each formed between a wiring resistor $R_d$ of the data line 300 and a line adjacent to the data line 300.

In a case in which the output signal is not detected despite an input of the inspection signal, it may be determined that the corresponding data line 300 experiences a short-circuit. More particularly, the OS inspection may be sequentially conducted on a plurality of adjacent data lines. Upon an inspection signal being applied to n-th data line, when an inspection signal is detected from (n−1)-th data line or (n+1)-th data line to which the inspection signal is not applied, it may be determined that a short-circuit between the n-th data line and an adjacent data line exists.

The OS inspection circuit 700 of FIG. 4 illustrates a process prior to forming a bridge electrode between the data fan-out line 320 and the data pad line 310 of the fan-out unit 400, in which the wiring resistor $R_d$ of the data line 300 and a resistor $R_{FO}$ of the data pad line 310 are disconnected from one another. In other words, since the inspection node $T_N$ for detecting an inspection signal is not electrically connected to the wiring resistor $R_{FO}$ of the data pad line 310, a defect of the data pad line 310 may not be detected.

Figure 5:
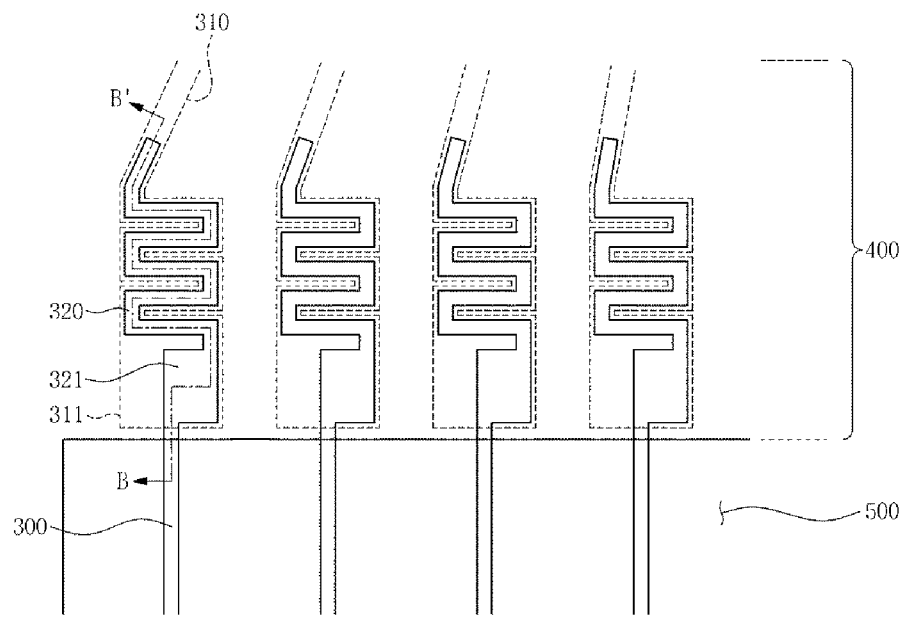
FIG. 5 is a plan view illustrating an LCD device in which a data fan-out line and a data pad line overlap one another according to an exemplary embodiment.

FIG. 5 is a plan view illustrating an LCD device in which a data fan-out line and a data pad line overlap one another according to an exemplary embodiment.

An end portion (not illustrated) of the data pad line 310 may include a pad unit for a connection to a driving integrated circuit or to an external circuit. The data pad line 310 and the data fan-out line 320 illustrated in FIG. 5 may overlap one another while opposing and being insulated from one another by a gate insulating layer 150. A fan-out capacitor $C_{FO}$ may be formed between the data fan-out line 320 and the data pad line 310 due to such a structure having lines opposing one another while being insulated from one another.

The capacity C of a general capacitor may be calculated by Equation 1.

$$C = \frac{\varepsilon_0 A}{d} \quad \text{[Equation 1]}$$

In Equation 1, the capacity C of the capacitor may be in proportion to the area A of the lines overlapping one another and to a dielectric constant $\varepsilon_0$ of an insulator and may be in inverse proportion to the interval between the opposing lines.

The capacitor is an electric circuit element accumulating electric charges in opposing plates, and has an electric property of blocking a DC current and bypassing an AC current. In a case of using an AC signal as an inspection signal, the opposing plates may be electrically connected to one another through the fan-out capacitor $C_{FO}$.

In an OS inspection, an AC inspection signal capable of determining a capacity of the fan-out capacitor $C_{FO}$ based on a charging/discharging property of the capacitor may be used. Since evaluating a signal is made easier as a capacity of a capacitor increases in an inspection circuit, it may be desirable that the capacitor have a relatively high capacity. The capacity of the fan-out capacitor $C_{FO}$ may be increased by increasing the overlapping area between the data pad line 310 and the data fan-out line 320, by decreasing the thickness of a gate insulating layer between the data pad line 310 and the data fan-out line 320, or by using a gate insulating layer having a high dielectric constant. In a case of modifying the property of the gate insulating layer, the property of the pixel region 500 may also need to be modified, and thus the modifying of the property of the gate insulating layer may not be deemed easily applicable herein. In this regard, it may be desirable that the overlapping area between the data fan-out line 320 and the data pad line 310 be increased. The data fan-out line 320 may have a data fan-out extension portion 321 having a relatively wide line width compared to the data lines, and the data pad line 310 may have a data pad extension portion 311 having a relatively wide line width compared to the data lines. The data fan-out extension portion 321 and the data pad extension portion 311 may overlap one another while opposing one another. The capacity of the fan-out capacitor $C_{FO}$ may be increased by increasing the overlapping area between the data pad line 310 and the data fan-out line 320. The fan-out capacitor $C_{FO}$ may not affect an operation of a driving integrated circuit since the fan-out capacitor $C_{FO}$ loses the unique property as a capacitor when a bridge electrode is formed in a subsequent process.

The data fan-out extension portion 321 and the data pad extension portion 311 may be disposed in any area in which the data pad line 310 and the data fan-out line 320 overlap one another. More particularly, however, the data fan-out extension portion 321 and the data pad extension portion 311 may be disposed in end portions of the data pad line 310 and the data fan-out line 320, respectively. For example, the data fan-out extension portion 321 and the data pad extension portion 311 may be disposed in an area between the data fan-out line 320 and the data line 300 as shown in FIG. 5.

The data pad line 310 may be formed through the same process as the process of forming the gate line 200, and may include or may be formed of at least one of the following metals: an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), and titanium (Ti). Further, the gate line 200 may have a multilayer structure including at least two conductive layers having different physical properties from one another. The multiple conductive layers may include at least one of the following metals: an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), and titanium (Ti). Further, the data pad line 310 and the gate line 200 may be formed simultaneously by using one mask.

The data fan-out line 320 may be formed simultaneously with the data line 300. The data fan-out line 320 may include or may be formed of, e.g., a refractory metal such as Mo, Cr, Ta, Ti, or the like, or an alloy thereof, and may have a multilayer structure including the refractory metal layer and a low-resistance conductive layer. Examples of the multilayer structure may include a double-layer structure having a Cr or Mo (or Mo alloy) lower layer and an Al (or Al alloy) upper layer, and a triple-layer structure having a Mo (or Mo alloy) lower layer, an Al (or Al alloy) intermediate layer, and a Mo (or Mo alloy) upper layer. However, the material forming the data line 300 is not limited thereto, and the data line 300 may be formed of various metals or conductive materials.

According to an exemplary embodiment, the configuration of FIG. 5 may be modified such that the data line 300 is replaced with a gate line, the data pad line 310 is replaced with a gate pad line, and the data fan-out line 320 is replaced with a gate fan-out line. In this embodiment, data line may be disposed on a substrate and directly connected to a data pad, while gate line is connected to a gate pad through the gate fan-out line and the gate pad line. It may be applicable for a top-gate transistor structure.

According to an exemplary embodiment, the lower substrate 100 may include a pixel region 500 and a fan-out unit 400 on a periphery of the pixel region 500. The pixel region 500 includes pixels. A pad line, e.g., the data pad line 310, may be disposed on the lower substrate 100 and electrically connected to a driving circuit. The pad line may be a gate pad line or a data pad line 310 illustrated herein. A portion of the pad line may be disposed in the fan-out unit 400. An insulating layer 150 may be disposed on the pad line. A conductive line, e.g. the data line 300 or the gate line 200, may be connected to a source electrode or a gate electrode of a transistor. A fan-out line, e.g., the data fan-out line 320 may extend from the conductive line to be disposed in the fan-out unit 400. The fan-out line may be configured to at least partially face the portion of the pad line. When the bridge electrode is not formed to electrically connect the fan-out line and the pad line, the pad line and the fan-out line are configured to form a capacitor, which facilitates the tests described with reference to e.g., FIG. 8. The upper substrate 110 may be configured to face to lower substrate 100.

Figure 11:
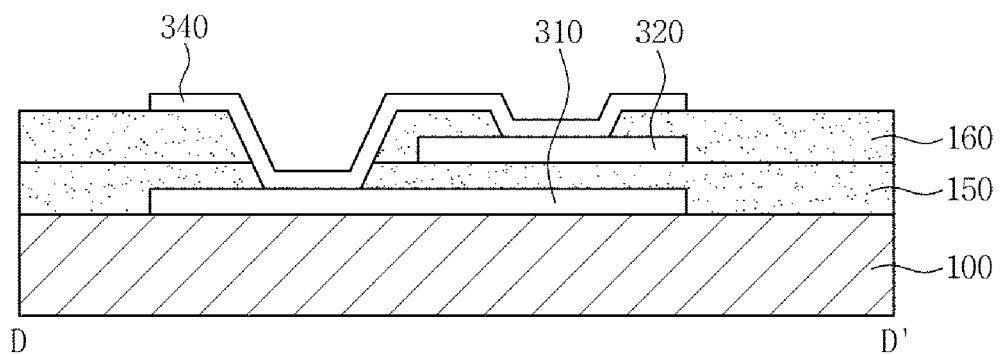
FIG. 11 is a cross-sectional view taken along section line D-D' of FIG. 9 according to an exemplary embodiment.

A bridge electrode, e.g., the bridge electrode 340 of FIG. 11, may be disposed to electrically connect the pad line and the fan-out line after the tests are performed. The portion of the pad line may include a pad extension portion, e.g., the data pad extension portion 311. The fan-out line may include a fan-out extension portion, e.g., the data fan-out extension portion 321, that faces the pad extension portion to form a capacitor prior to the formation of the bridge electrode.

Figure 6:
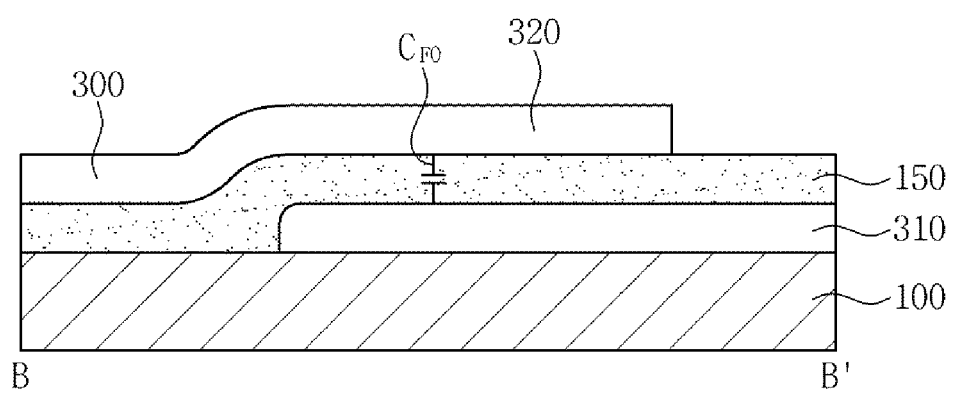
FIG. 6 is a cross-sectional view taken along section line B-B' of FIG. 5 according to an exemplary embodiment.

FIG. 6 is a cross-sectional view taken along section line B-B' of FIG. 5 according to an exemplary embodiment. In FIG. 6, an overlapping area between the data pad line 310 and the data fan-out line 320 is illustrated. The data pad line 310 and the data fan-out line 320 may oppose one another while having a gate insulating layer 150 therebetween. The gate insulating layer 150 protecting the data pad line 310 may include or may be formed of $SiN_x$, $SiO_x$, or the like. The gate insulating layer 150 may have a multilayer structure including at least two insulating layers having different physical properties from one another. A pad unit (not illustrated) which is formed in a portion of the gate insulating layer 150 that is removed may be formed at an end portion of the data pad line 310 so as to be connected to an external circuit element, such as a driving integrated circuit, or the like.

In order to increase the overlapping area between the data pad line 310 and the data fan-out line 320, the overlapping area between respective zigzag pattern portions of the data pad line 310 and the data fan-out line 320 may be increased, in addition to the increase in the overlapping area between the data pad extension portion 311 and the data fan-out extension portion 321. The data fan-out line 320 may extend along the data pad line 310 in a direction of the pad unit (not illustrated). However, in a case in which a sealant (not illustrated) has conductivity, when the data fan-out line 320 is disposed below the sealant (not illustrated), a signal interference issue between adjacent data fan-out lines 320 may arise. In addition, a load of the data line 300 may increase due to a capacitor formed between the data fan-out line 320 and the sealant (not illustrated). Thus, it may be desirable that an overlap between the data fan-out line 320 and the sealant (not illustrated) be prevented in a fan-out unit 400.

Based on the configuration illustrated above, the level of an output voltage due to an effect of the fan-out capacitor $C_{FO}$ which varies due to a short-circuit or a disconnection of the data pad line 310 may vary, and a presence of a defect in the data pad line 310 may be verified more effectively by evaluating such a variation in the output voltage.

Figure 7:
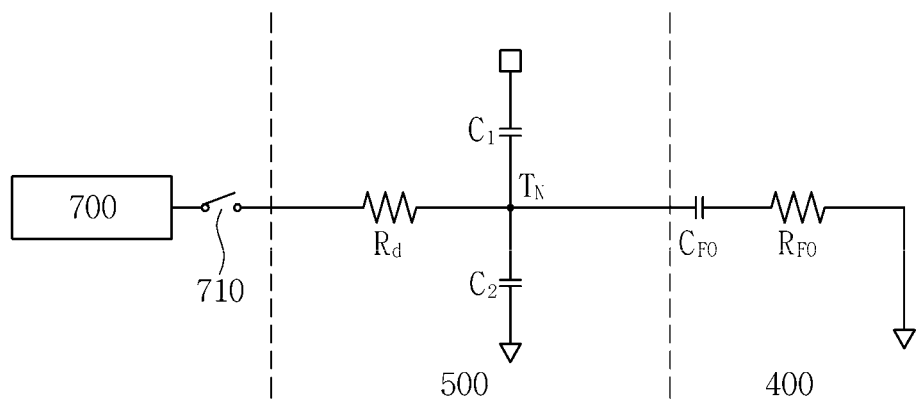
FIG. 7 is a view illustrating an equivalent circuit of an OS inspection circuit of a data fan-out line and a data pad line according to an exemplary embodiment.

FIG. 7 is a view illustrating an equivalent circuit of an OS inspection circuit of a data fan-out line and a data pad line according to an exemplary embodiment. The OS inspection circuit 700 may be connected to an OS inspection terminal disposed on a side of the data line 300 of the pixel region 500 through a switch 710. In the OS inspection circuit 700, an AC inspection signal having a predetermined frequency may be applied to the data line 300. The voltages of an inspection signal and an output signal in which a phase delay occurs may be detected by an equivalent circuit of a wiring resistor $R_d$ of the data line 300, parasitic capacitors $C_1$ and $C_2$, and the fan-out capacitor $C_{FO}$ formed between the data pad line 310 and the data fan-out line 320, at an inspection node $T_N$ connected to the data line 300.

A terminal on one side of the fan-out capacitor $C_{FO}$ may correspond to the data line 300 (or the data fan-out line 320), and a terminal on the other side of the fan-out capacitor $C_{FO}$ may correspond to the data pad line 310. In order to form a measurement circuit, the terminal on the other side of the fan-out capacitor $C_{FO}$, that is, the data pad line 310, may need to maintain a DC potential. Since maintaining the ground potential as a DC potential does not generally require an additional power device, it may be desirable that the ground potential be maintained as a DC potential. However, aspects are not limited thereto, and an electric potential other than the ground potential may be applied.

Since the OS inspection is conducted prior to forming a bridge electrode between the data fan-out line 320 and the data pad line 310 of the fan-out unit 400, a configuration of a closed circuit including the fan-out capacitor $C_{FO}$ may be provided.

In a case in which the capacity of the fan-out capacitor $C_{FO}$ formed by the overlapping area between the data fan-out line 320 and the data pad line 310 of FIG. 7 exceeds a preset range, a presence of a defect of the data fan-out line 320 and the data pad line 310 may be verified by detecting a rise or drop of an output voltage.

Figure 8:
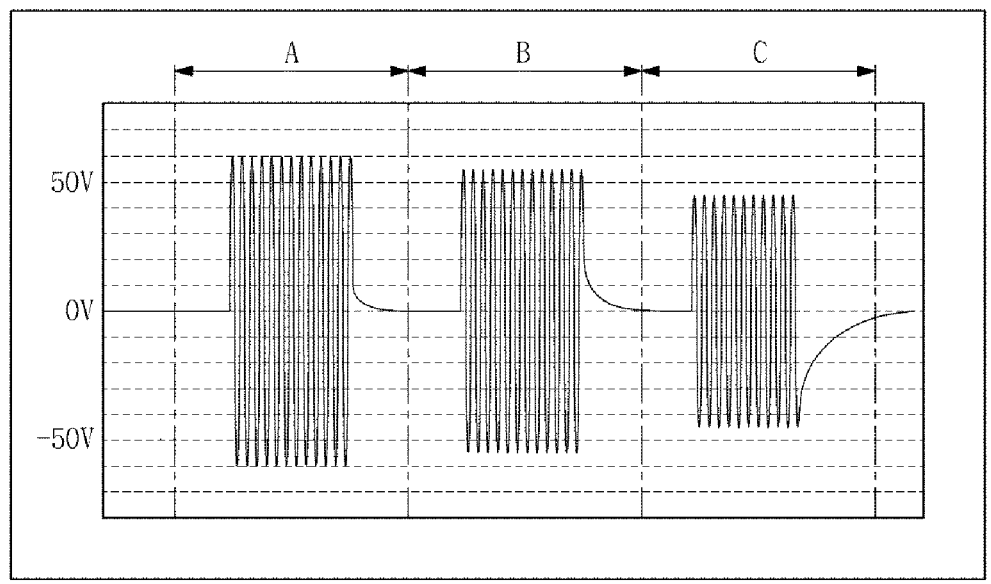
FIG. 8 is a view illustrating an output waveform during an OS inspection according to an exemplary embodiment.

FIG. 8 is a view illustrating an output waveform during an OS inspection according to an exemplary embodiment. In a case in which the OS inspection circuit 700 of FIG. 7 uses an AC wave of 400 KHz and 100V as an inspection signal, an output voltage of 55V may be detected at the inspection node $T_N$ due to the effect of the wiring resistor $R_d$, the parasitic capacitors $C_1$ and $C_2$, and the fan-out capacitor $C_{FO}$. A presence of a defect of the data pad line 310 may be verified by detecting a voltage of the output waveform.

Period B of FIG. 8 illustrates an output waveform in a case in which the data fan-out line 320 and the data pad line 310 are formed in a normal manner and the capacity of the fan-out capacitor $C_{FO}$ is set to have a reference level of about 50 pF within a normal range. Although the reference level within the normal range is set to be about 50 pF in the exemplary embodiment, the reference level may vary based on a size of a panel, a length of a fan-out unit, a level of resistance of a line, a dielectric constant of a gate insulating layer, and the like. Accordingly, the capacitance of the fan-out capacitor $C_{FO}$ may vary based on characteristics of a panel. A DC wave of an inspection signal of 100V may be detected as voltage of 55V at an output terminal.

In period A of FIG. 8, a side of the fan-out capacitor $C_{FO}$ may not maintain the ground potential due to a disconnection occurring in the data pad line 310 of the fan-out unit 400, and the fan-out capacitor $C_{FO}$ may be in a floating state. In the floating state, the charging/discharging of the fan-out capacitor $C_{FO}$ by an inspection signal may not be performed, and an output voltage having the level equal to the level of output voltage in a case in which the fan-out capacitor $C_{FO}$ is not connected (e.g., FIG. 4), the level being higher than that in a normal operation state, may be output. The output voltage being detected herein may have the level of 60V, which is higher than the level of a normal output voltage.

Period C of FIG. 8 illustrates an output signal waveform in a case in which a data pad line 310 is short-circuited with an adjacent data pad line and thus the capacity of the fan-out capacitor $C_{FO}$ is increased to have a level higher than the reference level of 50 pF. The level of capacity of the fan-out capacitor $C_{FO}$ may increase such that the maximum level of a voltage of the output waveform may be detected to be 45V which is lower than 55V in the normal operation state. Thus, the disconnection in the data pad line 310 (corresponding to period A) and the short-circuit of two data pad lines (corresponding to period C) may be effectively detected by configuring the fan-out capacitor $C_{FO}$ as illustrated above.

In FIG. 8, a scheme of detecting a defect of the data pad line 310 in the fan-out unit 400 based on the level of the voltage which is output by detecting the output of the signal voltage is illustrated. However, the voltage detection scheme illustrated in FIG. 8 is only given by way of example. A scheme of detecting a rising time Rt of a pulse by inputting a pulse having a wide pulse width, a scheme of inspecting a property of a frequency of a circuit by varying a frequency of an inspection signal, and the like, may also be employed. Through various inspection circuits detecting a capacity of a capacitor and various verification schemes, a presence of a defect of lines which are spaced apart from one another may be verified.

Figure 9:
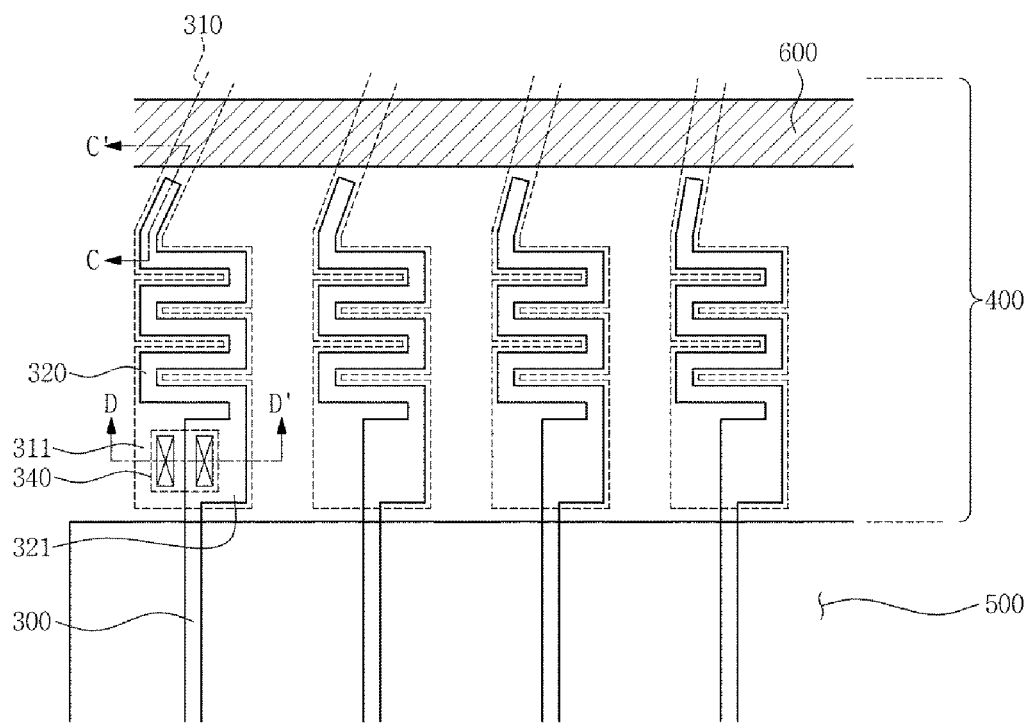
FIG. 9 is a plan view illustrating a structure of a fan-out unit of an LCD device according to an exemplary embodiment.

FIG. 9 is a plan view illustrating a structure of a fan-out unit of an LCD device according to an exemplary embodiment.

A sealant 600 may serve to couple and fix a lower substrate and an upper substrate to one another. The sealant 600 may be formed around a circumference of the pixel region 500, and may include a conductive ball (not illustrated) having conductivity. Through the use of such a conductive sealant, an effect of rapidly discharging, to the ground potential, induced static electricity may be achieved.

As illustrated in FIG. 9, an overlapping area between the data fan-out extension portion 321 and the data pad extension portion 311 may be disposed in an area between the pixel region 500 and the sealant 600 which bonds the lower substrate to the upper substrate. In particular, in the case where the sealant 600 has conductivity, in order to prevent a short-circuit between the data fan-out line 320 and the sealant 600 or an increase in the number of parasitic capacitors, it may be desirable to avoid an overlap between the data fan-out line 320 and the sealant 600.

A bridge electrode 340 of the fan-out unit 400 may electrically connect the data fan-out line 320 with the data pad line 310. The bridge electrode 340 may be formed adjacent to the pixel region 500 as shown in FIG. 9. Referring to FIG. 9, the bridge electrode 340 may be formed by removing a gate insulating layer and a protection layer, and may electrically connect the data fan-out extension portion 321 with the data pad extension portion 311. Since the data pad extension portion 311 is disposed below the data fan-out extension portion 321, the overlapping area between the data fan-out extension portion 321 and the data pad extension portion 311 and an area to be formed with the bridge electrode 340 may both be secured by forming the data pad extension portion 311 to have a greater area than that of the data fan-out extension portion 321.

Figure 10:
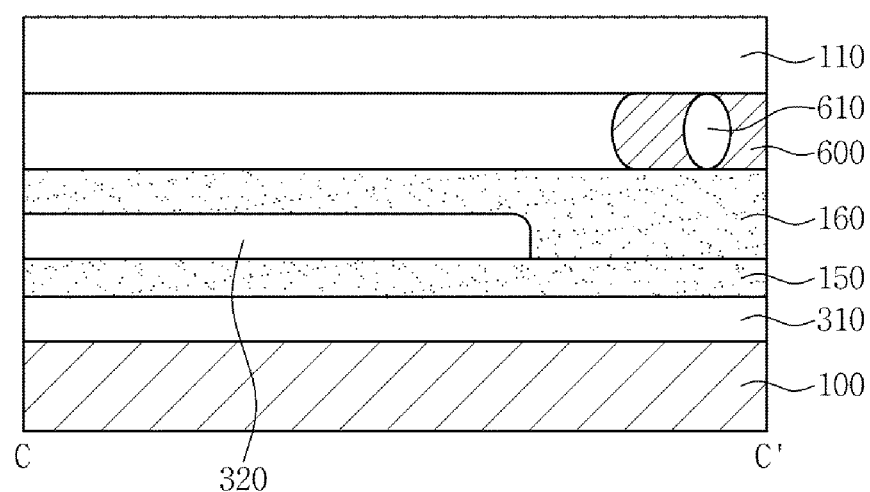
FIG. 10 is a cross-sectional view taken along section line C-C' of FIG. 9 according to an exemplary embodiment.

FIG. 10 is a cross-sectional view taken along section line C-C' of FIG. 9 according to an exemplary embodiment. Referring to FIG. 10, a lower substrate 100, the data pad line 310 disposed on the lower substrate 100, the gate insulating layer 150 disposed on the data pad line 310, the data fan-out line 320 disposed on the gate insulating layer 150, a protection layer 160 protecting the data fan-out line 320, an upper substrate 110, and a sealant 600 bonding the lower and upper substrates 100 and 110 to one another are illustrated.

The sealant 600 may include a conductive material, for example, a conductive ball 610. In the conductive ball 610, such as an organic material, may be dispersed in a medium of the conductive ball 610. In general, the conductive ball 610 is an elastomer having a spherical shape, and is coated with a metal material having conductivity, such as gold (Au) or silver (Ag). The size of the conductive ball 610 may be greater than or equal to a cell gap between the lower substrate 100 and the upper substrate 110. In FIG. 10, the cell gap may be the distance between the bottom surface of the upper substrate 110 and the top surface of the protection layer 160. In a case in which the size of the conductive ball 610 is greater than the cell gap, the conductive ball 610 may be compressed to have a height equivalent to a height of the cell gap when the lower substrate 100 and the upper substrate 110 are bonded to one another by a pressure, due to the elasticity of the conductive ball 610. When the sealant 600 having conductivity is used, it may be likely that a short-circuit of the data fan-out line 320 may occur by the sealant 600. Although the data fan-out line 320 extends in order to obtain the overlapping area between the data fan-out line 320 and the data pad line 310 for forming the fan-out capacitor $C_{FO}$, it may be desirable to configure the data fan-out line 320 such that the data fan-out line 320 does not extend to an area corresponding to a lower portion of the sealant 600. Based on a deviation that may occur in a process of coating the sealant 600, the distance between the lower and upper substrates 100 and 110 may be at least about 100 μm.

FIG. 11 is a cross-sectional view taken along section line D-D' of FIG. 9 according to an exemplary embodiment.

The data pad line 310, the gate insulating layer 150, the data fan-out line 320, the protection layer 160, and the bridge electrode 340 may be formed on the lower substrate 100. The bridge electrode 340 may be formed as a conductive electrode by removing portions of the gate insulating layer 150 and the protection layer 160 through etching, subsequent to the forming of the protection layer 160. The bridge electrode 340 may be formed using a highly conductive material such that the data fan-out line 320 and the data pad line 310 are electrically connected to one another through the bridge electrode 340. Since the bridge electrode 340 and a pixel electrode are formed through the same process, a transparent metal oxide layer may be used for the bridge electrode 340 as well as the pixel electrode. More particularly, the bridge electrode 340 may include or may be formed of a transparent metal oxide including at least one of the following conductive electrode materials: indium-tin oxide (ITO), indium-zinc oxide (IZO), aluminum-zinc oxide (AZO), gallium-zinc oxide (GZO), and gallium-indium-zinc oxide (GIZO).

Although FIG. 9 and FIG. 11 illustrate that the bridge electrode 340 is formed in a position in vicinity of the overlapping area between the data pad extension portion 311 and the data fan-out extension portion 321, the bridge electrode 340 may not necessarily be formed in vicinity of the aforementioned overlapping area. The aforementioned overlapping area and the bridge electrode 340 may be formed while being spaced apart from one another.

As set forth above, according to one or more exemplary embodiments, the LCD device may readily detect a short-circuit defect.

According to an exemplary embodiment, a liquid crystal display ("LCD") device having an overlapping electrode structure is provided, the overlapping electrode structure being capable of verifying a presence of a defect in a data line simultaneously with conducting an open-short ("OS") inspection on the data line, through the use of a capacitor formed by a data pad line and a data fan-out line that oppose one another while having an insulating layer therebetween.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device comprising:
a first substrate comprising a pixel region and a fan-out unit on a periphery of the pixel region, the pixel region comprising pixels;
gate lines disposed on the first substrate;
data lines disposed on the first substrate to intersect the gate lines, the data lines being insulated from the gate lines;
a data fan-out line extending from one of the data lines to be disposed in the fan-out unit;
a data pad line disposed in the fan-out unit and electrically connected to a driving integrated circuit;
a second substrate opposing the first substrate; and
a sealant bonding the first substrate to the second substrate,
wherein:
each of the data fan-out line and the data pad line comprises a zigzag pattern structure; and
the zigzag pattern structure of the data fan-out line overlaps the zigzag pattern structure of the data pad line between the pixel region and the sealant.

2. The liquid crystal display device of claim 1, further comprising a first insulating layer by which the data fan-out line and the data pad line are spaced apart from one another to form a capacitor.

3. The liquid crystal display device of claim 2, wherein the data fan-out line and the data pad line comprise different conductive materials from one another.

4. The liquid crystal display device of claim 3, wherein the data pad line comprises at least one of aluminum (Al), silver (Ag), copper (Cu), molybdenum (Mo), chromium (Cr), tantalum (Ta), titanium (Ti), and an alloy thereof.

5. The liquid crystal display device of claim 3, wherein the data fan-out line comprises at least one of molybdenum (Mo), chromium (Cr), tantalum (Ta), titanium (Ti), and an alloy thereof.

6. The liquid crystal display device of claim 2, wherein the first insulating layer and a gate insulating layer are formed simultaneously.

7. The liquid crystal display device of claim 6, wherein the data pad line and the gate lines comprise a same conductive material.

8. The liquid crystal display device of claim 6, wherein the data pad line and the gate lines are patterned simultaneously.

9. A liquid crystal display device comprising:
a first substrate comprising a pixel region and a fan-out unit on a periphery of the pixel region, the pixel region comprising pixels;
gate lines disposed on the first substrate;
data lines disposed on the first substrate to intersect the gate lines, the data lines being insulated from the gate lines;
a data fan-out line extending from one of the data lines to be disposed in the fan-out unit;
a data pad line disposed in the fan-out unit and electrically connected to a driving integrated circuit;
a second substrate opposing the first substrate;
a sealant bonding the first substrate to the second substrate; and
a first insulating layer by which the data fan-out line and the data pad line are spaced apart from one another,
wherein:
the data fan-out line overlaps the data pad line between the pixel region and the sealant;
the data fan-out line comprises a data fan-out extension portion having a line width greater than a line width of the data lines;
the data pad line comprises a data pad extension portion having a line width greater than the line width of the data lines; and
the data fan-out extension portion overlaps the data pad extension portion.

10. The liquid crystal display device of claim 9, wherein the line width of the data pad extension portion is greater than the line width of the data fan-out extension portion.

11. The liquid crystal display device of claim 9, further comprising a bridge electrode to electrically connect the data fan-out line with the data pad line.

12. The liquid crystal display device of claim 11, wherein the bridge electrode is disposed in the data pad extension portion and the data fan-out extension portion.

13. The liquid crystal display device of claim 11, wherein the bridge electrode comprises at least one of indium-tin oxide (ITO), aluminum-zinc oxide (AZO), gallium-zinc oxide (GZO), indium-zinc oxide (IZO), and gallium-indium-zinc oxide (GIZO).

14. The liquid crystal display device of claim 1, wherein the sealant is electrically conductive.

15. The liquid crystal display device of claim 14, wherein the sealant comprises a conductive ball.

16. The liquid crystal display device of claim 14, wherein a portion of the data pad line unsealed by the sealant is electrically connected to the driving integrated circuit.

17. A display device comprising:
a first substrate comprising a pixel region and a fan-out unit on a periphery of the pixel region, the pixel region comprising pixels;
a pad line disposed on the first substrate and electrically connected to a driving circuit, a portion of the pad line being disposed in the fan-out unit;
an insulating layer disposed on the pad line;
a conductive line configured to be connected to a gate electrode or a source electrode of a transistor, the conductive line being a gate line or a data line;
a fan-out line extending from the conductive line to be disposed in the fan-out unit, the fan-out line configured to at least partially face the portion of the pad line; and
a second substrate opposing the first substrate,
wherein:
each of the fan-out line and the pad line each comprises a zigzag pattern structure; and
the zigzag pattern structure of the fan-out line overlaps the zigzag pattern structure of the pad line.

18. The display device of claim 17, further comprising a bridge electrode configured to electrically connect the pad line with the fan-out line,
wherein:
the portion of the pad line comprises a pad extension portion; and
the fan-out line comprises a fan-out extension portion that faces the pad extension portion to form a capacitor prior to a formation of the bridge electrode.

* * * * *